(12) United States Patent
Moretti et al.

(10) Patent No.: US 12,013,068 B2
(45) Date of Patent: Jun. 18, 2024

(54) CONNECTION FOR FLUID WITH TWO WELDS

(71) Applicant: HUTCHINSON S.R.L., Rivoli (IT)

(72) Inventors: Nicola Moretti, Gassino (IT); Roberto Bertalmio, Orbassano (IT); Stéphane Ully, St Maurice sur Fessard (IT); Fabrizio Rocca, Leini (IT)

(73) Assignee: HUTCHINSON S.R.L., Rivoli (IT)

( * ) Notice: Subject to any disclaimer, the term of this patent is extended or adjusted under 35 U.S.C. 154(b) by 8 days.

(21) Appl. No.: 18/063,049

(22) Filed: Dec. 7, 2022

(65) Prior Publication Data

US 2023/0184365 A1  Jun. 15, 2023

(30) Foreign Application Priority Data

Dec. 14, 2021 (IT) .................. 102021000031232

(51) Int. Cl.
 *F16L 47/02* (2006.01)

(52) U.S. Cl.
 CPC .................. *F16L 47/02* (2013.01)

(58) Field of Classification Search
 CPC . F16L 47/02; F16L 13/00; F16L 13/02; F16L 37/08; F16L 37/084; F16L 37/0847; F16L 37/098; B23K 26/21; B23K 26/211; B23K 26/24; B23K 26/242; B23K 26/244; B23K 26/26; B23K 26/262; B23K 26/28; B23K 26/282; B23K 26/30; B23K 26/302
 USPC ............................................ 156/272.8, 308.2
 See application file for complete search history.

(56) References Cited

U.S. PATENT DOCUMENTS

| 2,933,428 | A | * | 4/1960 | Mueller | .............. B29C 66/1224 228/114.5 |
| 4,670,207 | A | * | 6/1987 | Yamada | .............. B29C 66/1226 156/322 |
| 5,143,407 | A | * | 9/1992 | Cokeh | ............... B29C 66/52296 285/55 |
| 5,636,875 | A | * | 6/1997 | Wasser | ................... F16L 47/02 285/332 |
| 11,143,336 | B1 | * | 10/2021 | Dupont, Jr. | ............. F16L 21/00 |
| 2003/0102671 | A1 | * | 6/2003 | Fritze | ................ B29C 66/12469 285/423 |
| 2004/0140668 | A1 | * | 7/2004 | Monsheimer | ....... B29C 65/1677 285/256 |

(Continued)

FOREIGN PATENT DOCUMENTS

| EP | 1941201 B1 | 7/2013 |
| WO | 98/41790 A2 | 9/1998 |

OTHER PUBLICATIONS

Search Report for Italian Patent Application No. 202100031232 (dated Jul. 8, 2022).

*Primary Examiner* — Aaron M Dunwoody
(74) *Attorney, Agent, or Firm* — Merchant & Gould P.C.

(57) ABSTRACT

A connection for a fluid includes a pipe; a connector in which a fluid is flows, and a housing in which the pipe is at least partially inserted. The pipe and the connector are in fluidic communication. A gasket is arranged in the housing and radially interposed between the pipe and the connector to prevent any leakage of fluid between the pipe and the connector. A closing element in which the pipe is inserted, is mounted both to the pipe (2) and to the connector by two respective welds ensuring fluid tightness.

12 Claims, 2 Drawing Sheets

(56) References Cited

U.S. PATENT DOCUMENTS

| | | | |
|---|---|---|---|
| 2005/0184515 A1* | 8/2005 | Isayama | B60K 15/03177 285/288.1 |
| 2007/0151970 A1* | 7/2007 | Zento | B29C 66/1224 219/678 |
| 2007/0272340 A1* | 11/2007 | Castaneda | B29C 66/1222 156/308.2 |
| 2008/0001398 A1* | 1/2008 | Stoll | B29C 66/12469 285/143.1 |
| 2008/0296888 A1* | 12/2008 | Blivet | F16L 37/0841 285/21.1 |
| 2010/0253067 A1* | 10/2010 | Isenburg | F16L 21/06 285/305 |
| 2011/0074145 A1 | 3/2011 | Schwarzkopf et al. | |
| 2011/0259447 A1* | 10/2011 | Ishizaka | F16K 15/033 137/511 |
| 2014/0375047 A1* | 12/2014 | Jones | F16L 47/03 285/21.1 |
| 2016/0040635 A1* | 2/2016 | Satarino | F16L 21/007 285/399 |
| 2017/0167653 A1* | 6/2017 | Coulson | B29C 66/73921 |
| 2017/0343141 A1* | 11/2017 | Roper | F16L 27/0804 |
| 2018/0094760 A1* | 4/2018 | Zinkand | B29C 66/3242 |
| 2019/0178424 A1* | 6/2019 | Sidgman Saitua | F16L 58/181 |
| 2019/0195409 A1* | 6/2019 | Corbett, Jr. | F16L 47/12 |
| 2019/0290896 A1* | 9/2019 | Phillips | A61M 39/12 |
| 2020/0269517 A1* | 8/2020 | Kullik | F16L 47/02 |
| 2021/0102649 A1* | 4/2021 | Imai | B29C 66/5221 |
| 2021/0316592 A1* | 10/2021 | Park | B29C 66/5221 |
| 2021/0356065 A1* | 11/2021 | Zaborszki | F16L 33/01 |
| 2022/0213996 A1* | 7/2022 | Imamura | B29C 66/52298 |

* cited by examiner

CONNECTION FOR FLUID WITH TWO WELDS

TECHNICAL FIELD

The present invention relates to a connection for a fluid, in particular for use in the automotive industry. The connection is intended for creating a fluid line, e.g. for liquids.

TECHNICAL BACKGROUND

In the automotive industry it is known to make a connection for a fluid comprising: a pipe, a connector in which a fluid is intended to flow and including a housing in which the pipe is at least partially inserted, wherein the pipe and the connector are in fluidic communication. The pipe and the connector are made of polymeric material and are joined together by laser welding, which creates a cylindrical welding surface that prevents any leakage of fluid. Hydraulic tightness is entirely entrusted to the weld.

However, this type of system suffers from a few drawbacks. One drawback is that providing hydraulic tightness by means of the weld alone is not very reliable, so that fluid leakage may occur.

SUMMARY OF THE INVENTION

It is one object of the present invention to provide a connection capable of overcoming this and other drawbacks of the prior art while at the same time being simple and economical to make.

According to the present invention, this and other objects are achieved through a connection made in accordance with the appended independent claim.

It is understood that the appended claims are an integral part of the technical teachings provided in the following detailed description of the present invention. In particular, the appended dependent claims define some preferred embodiments of the present invention that include some optional technical features.

BRIEF DESCRIPTION OF THE DRAWINGS

Further features and advantages of the present invention will become apparent in light of the following detailed description, provided merely as a non-limiting example and referring to the annexed drawings, wherein.

DETAILED DESCRIPTION OF THE INVENTION

Figure 1:
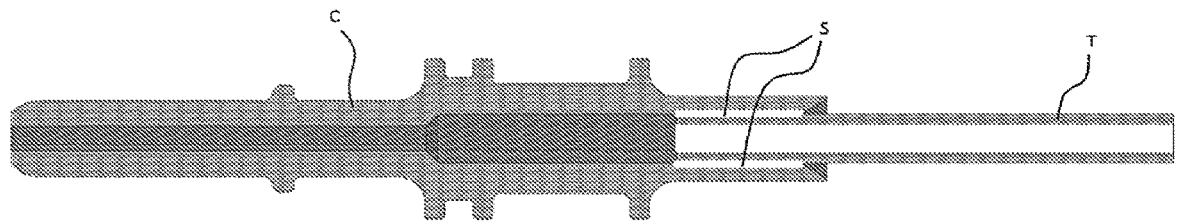
FIG. 1 is a longitudinal sectional view of a connection according to the prior art.

With reference to the annexed drawings, there is shown a connection 1 for a fluid, which comprises:

a pipe 2, a connector 4 in which a fluid is intended to flow, and including a housing 5 in which pipe 2 is at least partially inserted, wherein pipe 2 and connector 4 are in fluidic communication, a gasket 6 (an O-ring in the example) arranged in housing 5 and radially interposed between pipe 2 and connector 4 to prevent any leakage of fluid between pipe 2 and connector 4, a closing element 8 in which pipe 2 is at least partially inserted; wherein closing element 8 is mounted to both pipe 2 and connector 4 by means of two respective welds 9, 7 ensuring fluid tightness.

FIG. 1 shows a connection for a fluid according to the prior art, which comprises: a pipe T, a connector C in which a fluid is intended to flow and including a housing in which pipe T is at least partially inserted, wherein pipe T and connector C are in fluidic communication. Pipe T and connector C are made of polymeric material and are joined together by laser welding S, which creates a cylindrical welding surface that prevents any leakage of fluid. Hydraulic tightness is entirely entrusted to weld S.

The presence of gasket 6 in addition to welds 7, 9 significantly improves the tightness of the connection between pipe 2 and connector 4, thus preventing any leakage of fluid through connection 1. Therefore, the risk of an undesired leakage of fluid at the junction between pipe 2 and connector 4 is minimized or totally avoided. Hydraulic tightness is thus ensured by welds 7, 9 and also by gasket 6, which create a redundancy of sealing elements. The fluid intended to flow through connection 1 may be a liquid or a gas.

Figure 2:
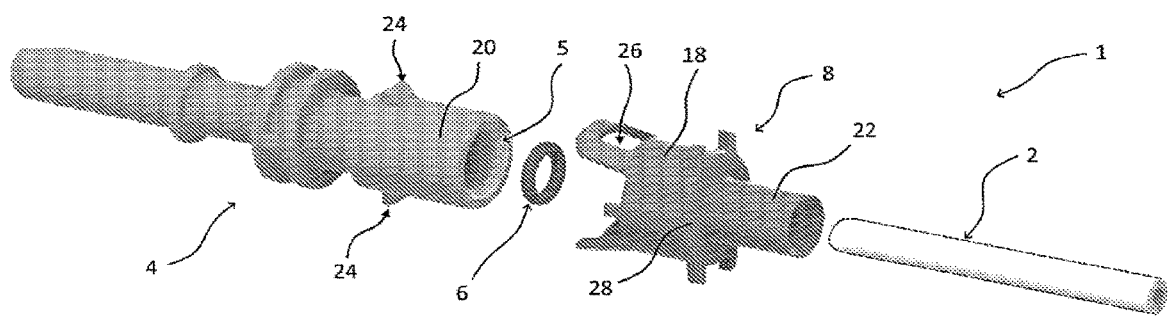
FIG. 2 is an exploded view of a connection according to a particular embodiment of the present invention.

Pipe 2 and connector 4 have each a respective cavity 11, 13 defining a duct in which the fluid can flow, as shown in the example of FIG. 2. In particular, the cavities have a circular cross-section. When the connection is assembled, cavities 11, 13 of pipe 2 and of connector 4 are in fluidic communication, so that the fluid can flow through connection 1.

Figure 3:
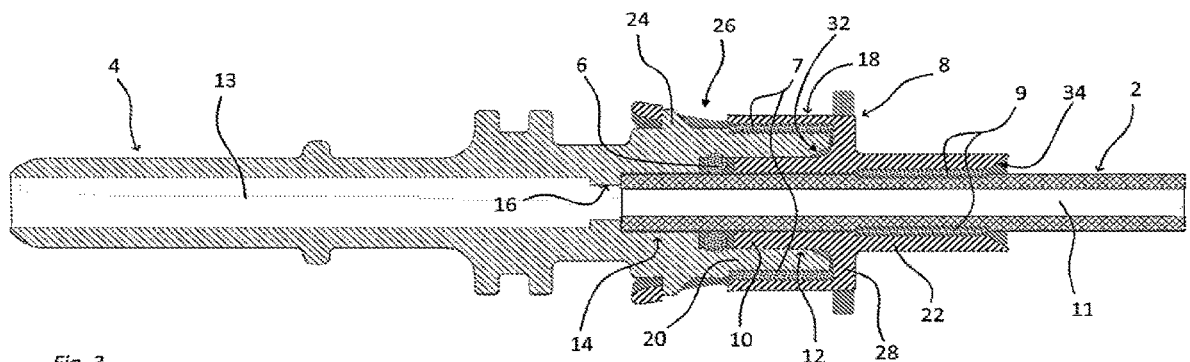
FIG. 3 is a longitudinal sectional view of the connection of FIG. 2 in an assembled configuration.

In particular, welds 7, 9 have a continuous perimetric (annular in the example) profile. In particular, welds 7, 9 are arranged in a ring-like fashion around connector 4 and around pipe 2, respectively. In more detail, the welds have a cylindrical profile. Conveniently, welds 7, 9 are made by laser welding. In the example of FIG. 3, welds 7, 9 are offset relative to an axis of insertion (which is horizontal in FIG. 3) of pipe 2 into connector 4. There are a first weld 7 between connector 4 and closing element 8, and a second weld 9 between closing element 8 and pipe 2.

Preferably, pipe 2, connector 4 and closing element 8 are made of polymeric material. Conveniently, pipe 2 is made of polyamide. In general, the areas where welds 7, 9 are made are preferably made of polymeric material. Also gasket 6 is preferably made of polymeric material.

In the embodiment shown herein, closing element 8 comprises a first perimetric portion 10 radially interposed between pipe 2 and connector 4. The first perimetric portion 10 surrounds, and optionally may be in contact with, pipe 2. In particular, perimetric portion 10 has a continuous or tubular profile. In the illustrated example, perimetric portion 10 has an annular or cylindrical shape.

Housing 5 is a hollow portion in which a part of pipe 2 is inserted. In particular, housing 5 is defined by a first wall 12 with a greater internal dimension, in particular a greater inside diameter, and by a second wall 14 having a smaller internal dimension, in particular a smaller inside diameter. The first wall 12 is adapted to envelop the first perimetric portion 10, and the second wall 14 is adapted to envelop pipe 2. In the example, the first and second walls 12, 14 are concentric. In the example, the first and second walls 12, 14 are cylindrical. In particular, the first and second walls 12, 14 are in contact with the first perimetric portion 10 and, respectively, pipe 2. In particular, the first and second walls 12, 14 have a shape which is complementary to that of the first perimetric portion 10 and, respectively, that of pipe 2. In particular, gasket 6 is interposed by contact between pipe 2 and the first wall 12. In general, gasket 6 is in contact with pipe 2 and with connector 4 (in particular, with housing 5). The first and second walls 12, 14 belong to connector 4.

Pipe 2 may also be a tubular portion of a particular element. In the example, pipe 2 is straight. In particular, pipe 2 has a circular cross-section.

Conveniently, housing 5 includes an abutment portion 16 whereon an end of pipe 2 is intended to abut, and which permits the fluid to flow through pipe 2 and connector 4 (in particular, towards a cavity 13 of connector 4). In particular, abutment portion 16 is a terminal part of housing 5 facing towards the inside of connector 4. In particular, abutment portion 16 defines a hole having a smaller diameter than housing 5, particularly than the second part 14. Abutment portion 16 acts as a stopper when pipe 2 is inserted into connector 4 during the assembly process, allowing pipe 2 to be correctly positioned relative to connector 4.

In the example, closing element 8 comprises a second perimetric portion 18 which is radially external to connector 4, wherein the second perimetric portion 18 and connector 4 are welded together. In particular, a radially internal surface of the second perimetric portion 18 is welded to a radially external surface of connector 4.

In the example, the first and/or the second perimetric portions 10, 18 have a tubular, in particular cylindrical, shape. In particular, pipe 2 is elongated. In the example, connector 4 is elongated too.

With reference to the drawings, connector 4 has a tubular, in particular cylindrical, wall 20 which is radially interposed between the first and second perimetric portions 10, 18. The first weld 7 is made on an external face of tubular wall 20. Tubular wall 20 shown herein defines housing 5. In the example, tubular wall 20 is interposed between, and in contact with, the first and second perimetric portions 10, 18.

Pipe 2 is inserted in a through hole of closing element 8. The hole is defined by surfaces whose shape is complementary to the external surface of pipe 2. In particular, the surfaces of the hole have a tubular, in particular cylindrical, shape. The through hole of closing element 8 thus defines a cylindrical cavity in which pipe 2 is inserted.

In the example, pipe 2 partially protrudes from connector 4 and from the closing element 8. In particular, a first tract of pipe 2 is in contact with closing element 8, and a second tract of pipe 2 is in contact with connector 4 (in particular, with the second part 14).

In particular, the second weld 9 is external to connector 4 with reference to the axis of insertion. In particular, the second weld 9 is external to housing 5. In the example, closing element 8 comprises a tubular, in particular cylindrical, neck 22 which is external to housing 5. The second weld 9 is made on such neck 22. Neck 22 shown herein has a shape which is complementary to pipe 2, and pipe 2 is inserted in neck 22. Neck 22 defines, at least partly, the through hole in which pipe 2 is inserted.

Preferably, closing element 8 and connector 4 comprise quick coupling means for mounting closing element 8 to connector 4. This makes it possible to keep parts 4 and 8 mutually in position during the welding phase. Moreover, the quick coupling improves the mutual fixing of parts 4 and 8. In the example, the quick coupling means include a clip-type or snap-type mechanism. In more detail, connector 4 comprises a tooth 24 adapted to fit into an aperture 26 or recess of closing element 8. In particular, there are two teeth 24 and two recesses 26, which in the example are located in diametrically opposite positions. As the closing element 8 is engaged with connector 4, tooth 24 and/or closing element 8 will become deformed, so that tooth 24 will fit into aperture 26. Tooth 24 and the aperture are configured to prevent closing element 8 from sliding off connector 4. In the example shown herein, aperture 26 is formed on the second perimetric portion 18, and tooth 24 is formed on a radially external portion of connector 4, in particular on tubular wall 20.

According to one possible variant of the invention, closing element 8 and connector 4 comprise respective threaded surfaces, so that they 4, 8 can be screwed to each other. In such a case, no quick coupling means are provided.

Conveniently, closing element 8 includes a stopper portion 28 whereon an end of connector 4 is intended to abut, so as to limit the mutual insertion of closing element 8 and connector 4. With particular reference to the embodiment illustrated herein, stopper portion 28 is an annular wall. With reference to the longitudinal sectional view of FIG. 3, stopper portion 28 is a wall that connects the first and second perimetric portions 10, 18. As closing element 8 approaches connector 4, an end of the connector, particularly an end of tubular wall 20, abuts on stopper portion 28; in the example shown herein, in such position the tooth 24 has just entered aperture 26. In more detail, stopper portion 28 and the first and second perimetric portions 10, 18 form, in a longitudinal sectional view, a recess in which an end of connector 4, particularly an end of tubular wall 20, is inserted.

Conveniently, connector 4 has a flare 32 at one end thereof to facilitate the insertion of closing element 8. Conveniently, closing element 8 has a flare 34 at one end thereof to facilitate the insertion of pipe 2. Flare 32 may also be useful to facilitate the insertion of pipe 2 into connector 4.

Figure 4:
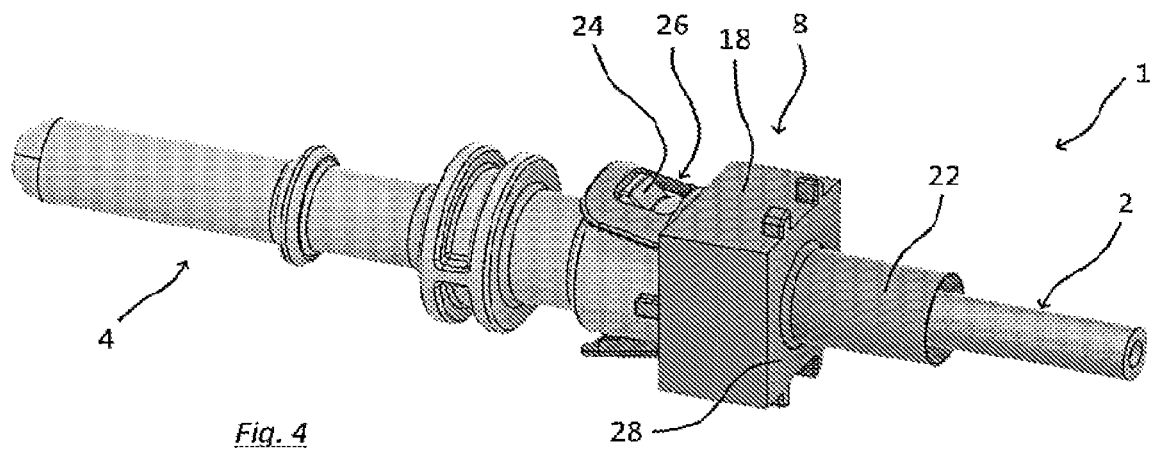
FIG. 4 is a perspective view of a connection according to a different embodiment of the present invention.
Figure 5:
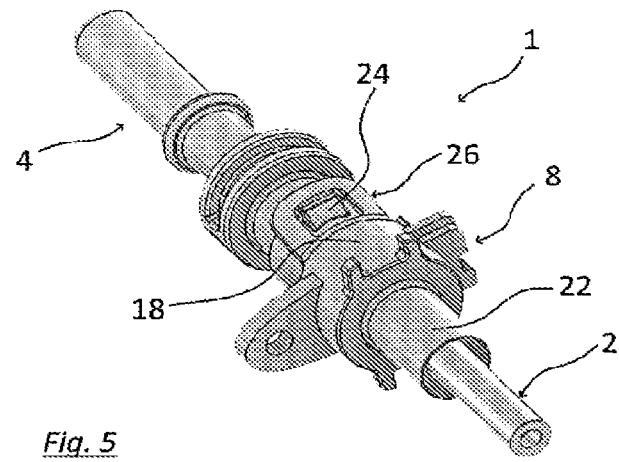
FIG. 5 is a perspective view of a connection according to a different embodiment of the present invention.
Figure 6:
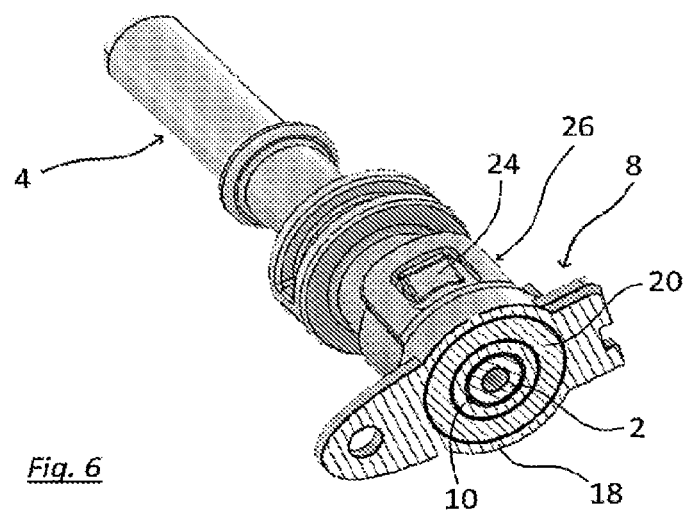
FIG. 6 shows a cross-section of the connection of FIG. 5.

In general, connection 1 may optionally include a non-straight pipe 2 or a non-straight connector 4. Pipe 2, closing element 8 and connector 4 may have shapes and cross-sections other than those illustrated and described herein, without however departing from the scope of the present invention. For example, one or more of such elements may have a polygonal, rectangular or square cross-section. Therefore, also the portions or elements identified by numerals 6, 10, 12, 14, 16, 18, 20, 22, 28 may have such shapes. In FIG. 4, closing element 8 has a square second perimetric portion 18. Moreover, the various elements may also have different shapes. In accordance with some possible variants, each element may have, in a sectional view, an inner surface having a shape which is different from that of the outer surface.

The following will describe a process of assembling connection 1. Inserting pipe 2 through closing element 8 (particularly through the through hole) so that a portion of pipe 2 protrudes from closing element 8; making weld 9 between pipe 2 and closing element 8; inserting gasket 6 into housing 5; inserting the end of pipe 2 that protrudes from closing element 8 into housing 5, through gasket 6, until the end of pipe 2 abuts on abutment portion 16 and, particularly, until tooth 24 fits into aperture 26; making weld 7 between closing element 8 and connector 4.

The following will describe an alternative process of assembling connection 1. Inserting gasket 6 into housing 5; fitting closing element 8 to connector 4, particularly until tooth 24 fits into aperture 26; inserting pipe 2 into the through hole of closing element 8, until it crosses gasket 6 and abuts on abutment portion 16 of connector 4; making welds 7, 9, in particular simultaneously. This second assembly process offers the advantage that both welds 7, 9 can be made at the same time.

For mounting closing element 8 to connector 4, quick coupling means, particularly clip-type means, are used in this example. In more detail, as closing element 8 approaches connector 4, the at least one tooth 24 fits into the respective aperture 26.

Of course, without prejudice to the principle of the invention, the forms of embodiment and the implementation details may be extensively varied from those described and illustrated herein by way of non-limiting example, without however departing from the scope of the invention as set out in the appended claims.

The invention claimed is:

1. A connection for a fluid, comprising:
   a pipe,
   a connector in which a fluid flows, and including a housing in which the pipe is at least partially inserted, wherein the pipe and the connector are in fluidic communication,
   a gasket arranged in the housing and radially interposed between the pipe and the connector to prevent leakage of fluid between the pipe and the connector
   a closing element in which the pipe is at least partially inserted, wherein the closing element is mounted to both the pipe and the connector by two respective welds ensuring fluid tightness.

2. The connection according to claim 1, wherein the welds have a continuous perimetric profile.

3. The connection according to claim 1, wherein the pipe, the connector and the closing element are made of polymeric material.

4. The connection according to claim 1, wherein the closing element comprises a first perimetric portion radially interposed between the pipe and the connector.

5. The connection according to claim 4, wherein the weld between the closing element and the pipe is made on the first perimetric portion.

6. The connection according to claim 1, wherein the closing element comprises a tubular neck external to the housing, and the weld between the closing element and the pipe is made on the neck.

7. The connection according to claim 1, wherein the closing element comprises a second perimetric portion radially external to the connector, wherein the second perimetric portion and the connector are welded together.

8. The connection according to claim 1, wherein the housing includes an abutment portion abutting an end of the pipe, and which permits the fluid to flow through the pipe and the connector.

9. The connection according to claim 4, wherein the housing is defined by a first wall having a bigger internal dimension and a second wall having a smaller internal dimension; wherein the first wall is adapted to envelop the first perimetric portion, and the second wall is adapted to envelop the pipe.

10. The connection according to claim 1, wherein the closing element and the connector comprise a quick coupling for mounting the closing element to the connector.

11. The connection according to claim 1, wherein the connector has a flare at one end thereof to facilitate insertion of the closing element into the connector.

12. The connection according to claim 1, wherein the closing element has a flare at one end thereof to facilitate insertion of the pipe into the closing element.

* * * * *